(12) United States Patent
Forster

(10) Patent No.: US 8,606,174 B2
(45) Date of Patent: Dec. 10, 2013

(54) PORTABLE RADIO-FREQUENCY REPEATER

(75) Inventor: Ian J. Forster, Essex (GB)

(73) Assignee: Avery Dennison Corporation, Mentor, OH (US)

( * ) Notice: Subject to any disclaimer, the term of this patent is extended or adjusted under 35 U.S.C. 154(b) by 541 days.

(21) Appl. No.: 12/966,042

(22) Filed: Dec. 13, 2010

(65) Prior Publication Data

US 2012/0149300 A1 Jun. 14, 2012

(51) Int. Cl.
*H04B 3/36* (2006.01)
*H04B 7/14* (2006.01)

(52) U.S. Cl.
USPC ............ 455/7; 455/11.1; 455/13.3; 340/10.1; 340/572.1

(58) Field of Classification Search
USPC ......................... 455/11.1, 7, 41.1, 41.2, 13.3; 340/10.1–10.4, 572.1–572.3, 340/572.7–572.9
See application file for complete search history.

(56) References Cited

U.S. PATENT DOCUMENTS

| 7,423,535 | B2 * | 9/2008 | Chung et al. | 340/572.4 |
| 7,606,530 | B1 * | 10/2009 | Anderson et al. | 455/7 |
| 2006/0012464 | A1 | 1/2006 | Nitzan et al. | |
| 2006/0022802 | A1 * | 2/2006 | Bridgelall | 340/10.33 |
| 2006/0208899 | A1 * | 9/2006 | Suzuki et al. | 340/572.7 |
| 2007/0080804 | A1 * | 4/2007 | Hirahara et al. | 340/572.1 |
| 2008/0018434 | A1 * | 1/2008 | Carrender et al. | 340/10.31 |
| 2008/0157924 | A1 | 7/2008 | Batra | |
| 2008/0198015 | A1 | 8/2008 | Lawrence | |
| 2010/0127835 | A1 * | 5/2010 | Pomerantz | 340/10.3 |
| 2013/0009754 | A1 * | 1/2013 | Noel et al. | 340/10.2 |
| 2013/0035090 | A1 * | 2/2013 | Moshfeghi | 455/422.1 |

OTHER PUBLICATIONS

International Search Report dated Mar. 15, 2012 for International Application No. PCT/US2011/063229 filed Dec. 5, 2011.
Written Opinion dated Mar. 15, 2012 for International Application No. PCT/US2011/063229 filed Dec. 5, 2011.

* cited by examiner

*Primary Examiner* — Sujatha Sharma

(57) ABSTRACT

A portable radio-frequency repeater includes a housing and a transceiver. The transceiver is disposed at least partially within the housing and configured to alternatively operate in a transmitting mode and a sleep mode. The transceiver includes an antenna and a control unit. The control unit is in electrical communication with the antenna. When the transceiver operates in the transmitting mode, the control unit is configured to receive an RFID signal from the antenna, convert the RFID signal into a converted RFID signal, and transmit the converted RFID signal to the antenna. When the transceiver operates in the sleep mode, the control unit is configured to detect an interrogation signal from the antenna and not to transmit any converted RFID signal to the antenna.

24 Claims, 14 Drawing Sheets

PORTABLE RADIO-FREQUENCY REPEATER

TECHNICAL FIELD OF THE INVENTION

A portable radio-frequency repeater is provided in cooperation with a reader system to facilitate the capture of signals from a plurality of transponders. The portable repeater includes a housing and a transceiver and which is capable of being activated based on a pre-determined stimulus, such as signal strength in order to enable the reading of the tagged items.

BACKGROUND OF THE INVENTION

Conventionally, a radio frequency identification (RFID) system includes an RFID reader that is configured to communicate with a plurality of RFID transponders by way of radio frequency (RF) transmissions. Typically, each of the RFID transponders is associated with an RFID-enabled item, such as a shipping parcel, for example, and stores particularized data about the associated item (e.g., manufacturer, manufacturing date, destination, and/or account information). The RFID reader communicates with the RFID transponders to gather particularized data about each RFID-enabled item. Oftentimes, a plurality of RFID-enabled items are arranged in a group such as to facilitate shipping (e.g., palletized, retained in a cargo container). When the RFID reader attempts to communicate with each of the plurality of RFID-enabled items within the group, some of the items located along the perimeter of the group may affect the ability of the RFID reader to communicate with some of the RFID transponders (e.g., due to loss of signal power or signal degradation).

BRIEF SUMMARY OF THE INVENTION

The embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention.

In accordance with one embodiment, a portable RF repeater comprises a housing and a transceiver. The transceiver is disposed at least partially within the housing and is configured to alternatively operate in a tag reading and data relay mode and a sleep mode. The transceiver includes an antenna and a control unit. The control unit is in electrical communication with the antenna. When the transceiver operates in the tag reading and data relay mode, the control unit is configured to receive an RFID signal from the antenna, convert the RFID signal into a converted RFID signal, and transmit the converted RFID signal to the antenna to relay the result to the reader system. The relay of tag data can be achieved by a number of means, such as use of a separate data link, operating in the 2.45 GHz band, such as Bluetooth® or via a suitable wireless LAN, or by the repeater emulating a tag of the same data as that to be relayed. When the transceiver operates in the sleep mode, the control unit is configured to detect an interrogation signal from the antenna and not to transmit any converted RFID signal to the antenna. The transceiver is configured to switch operation from the sleep mode to the tag reading mode upon detection by the control unit of the interrogation signal.

The activation from the sleep mode occurs as a result of predetermined stimulus (RF signal strength) or set of external stimuli (for example, presence of external read, but potentially sensors such as light or movement). Should the external reader require help to read tags in a local zone around the repeater. If marginal, cloaking of the repeater antennas to decrease the impact on local groups of tags for a period. Determination of the read success can be achieved by monitoring protocol and/or tag re-transmissions. If the reader requires help, read local tags with transmit signal that is synchronized to external reader system to avoid interference. Relay tag ID's to the external reader system by either a UHF data link, emulation of a series of tags with the ID's of the tags in the local group, emulation of a single tag with extended memory containing the ID's of all the tags in the local group or transmission of the data by other method such as WLAN or Bluetooth®. Then return the reader to sleep mode.

In accordance with another embodiment, the interrogation signal activates the transceiver to perform one of a series of functions and to enable the reading of a plurality of tagged items by a reader system.

In accordance with yet another embodiment, the transceiver further includes a timer, wherein the timer is configured to switch operation of the transceiver from the transmitting mode to the sleep mode after a predetermined period of time following detection by the control unit of the interrogation signal.

In accordance with yet another embodiment, the portable RF repeater further includes a power source configured to power the transceiver and at least partially disposed within the housing.

In accordance with yet another embodiment, the power source includes at least one of a capacitor and a battery.

In accordance with yet another embodiment, the power source includes a battery, and the antenna includes a conductive structure coupled with an exterior surface of the battery.

In accordance with yet another embodiment, the antenna includes a three-dimensional antenna.

In accordance with yet another embodiment, the antenna includes one of a slot antenna, a patch antenna, and a dipole antenna.

In accordance with yet another embodiment, the antenna includes a dipole antenna, and the dipole antenna includes a triple-crossed dipole antenna.

In accordance with yet another embodiment, the antenna is formed from a ceramic material.

In accordance with yet another embodiment, the antenna has an antenna impedance, and when the transceiver is in the sleep mode, the antenna impedance is increased as compared to when the transceiver is in the transmitting mode.

In accordance with yet another embodiment, the control unit is configured to measure a signal power of the interrogation signal and switch operation from the sleep mode to the transmitting mode when the signal power is below a threshold power.

In accordance with yet another embodiment, the antenna is configured to receive the RFID signal from a plurality of RFID transponders.

In accordance with yet another embodiment, the antenna is configured to receive the interrogation signal from an RFID reader.

In accordance with yet another embodiment, the control unit is configured to detect acknowledge messages transmitted from an RFID reader to RFID transponders and switch operation from the sleep mode to the transmitting mode when the ratio of acknowledge message quantity to RFID transponders is below a threshold level.

In accordance with yet another embodiment, a portable RF repeater includes a housing, a transceiver, and a battery. The transceiver is disposed at least partially within the housing. The transceiver is configured to alternatively operate in a transmitting mode and a sleep mode. The transceiver includes a triple-crossed dipole antenna and a control unit. The triple-crossed dipole antenna is configured to receive an RFID signal from a plurality of RFID transponders and to receive an interrogation signal from an RFID reader. The control unit is in electrical communication with the triple-crossed dipole antenna. The battery is disposed at least partially within the housing and is configured to power the transceiver. When the transceiver operates in the transmitting mode, the control unit is configured to receive the RFID signal from the triple-crossed dipole antenna, convert the RFID signal into a converted RFID signal, and transmit the converted RFID signal to the triple-crossed dipole antenna. When the transceiver operates in the sleep mode, the control unit is configured to detect the interrogation signal from the triple-crossed dipole antenna and not to transmit any converted RFID signal to the triple-crossed dipole antenna.

In accordance with yet another embodiment, the control unit is configured to detect acknowledgement messages transmitted from an RFID reader to RFID transponders and switch operation from the sleep mode to the transmitting mode when the ratio of acknowledgement message quantity to RFID transponders is below a threshold level.

In accordance with yet another embodiment, the triple-crossed dipole antenna includes a conductive structure coupled with an exterior surface of the battery.

In accordance with yet another embodiment, a portable RF repeater includes a housing and a transceiver. The transceiver is disposed at least partially within the housing. The transceiver is configured to alternatively operate in a transmitting mode and a sleep mode. The transceiver includes an antenna and a control unit. The antenna has an antenna impedance and is configured to receive an RFID signal from a plurality of RFID transponders and to receive an interrogation signal from an RFID reader. The control unit is in electrical communication with the antenna. When the transceiver operates in the transmitting mode, the control unit is configured to receive the RFID signal from the antenna, convert the RFID signal into a converted RFID signal, and transmit the converted RFID signal to the antenna. When the transceiver operates in the sleep mode, the antenna impedance is increased as compared to when the transceiver is in the transmitting mode. Also, when the transceiver operates in the sleep mode, the control unit is configured to detect the interrogation signal from the antenna and not to transmit any converted RFID signal to the antenna. The transceiver is configured to switch operation from the sleep mode to the transmitting mode upon detection by the control unit of the interrogation signal.

In a further exemplary embodiment of the presently described invention, a method of using a portable RFID repeater is described and includes the steps of initially providing a RFID repeater that has a transceiver disposed within a housing and has a sleep mode and an activated mode. Next, a plurality of articles with at least some of the articles having RFID transponders disposed thereon is supplied and a plurality of signals is generated from the transponders. The plurality of signals is received at a RFID reader and if the RFID reader is able to determine if it is receiving and reading the plurality of signals, the RFID repeater is activated to change from the sleep mode to the activated mode. Next, the plurality of signals is read to determine ID's for each of the plurality of articles and the IDs from the RFID repeater is relayed to the reader system. Finally, the RFID repeater is deactivated to change from an activated mode to a sleep mode.

In a yet still further exemplary embodiment of the presently described invention, a method for reading a plurality of RFID transponders is provided and includes the steps of initially providing a plurality of RFID transponders and then generating a signal to read the RFID transponders. A response is received from each of the RFID transponders and a portable RFID repeater is activated based on the response that is received from the RFID transponders. Next, the response from each of the RFID transponders is read to determine an ID and the response is relayed from the RFID repeater to the RFID reader and the RFID repeater is deactivated.

Other features and advantages of the present invention will become apparent to those skilled in the art from the following detailed description. It is to be understood, however, that the detailed description of the various embodiments and specific examples, while indicating preferred and other embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

These, as well as other objects and advantages of this invention, will be more completely understood and appreciated by referring to the following more detailed description of the presently preferred exemplary embodiments of the invention in conjunction with the accompanying drawings, of which.

DETAILED DESCRIPTION OF THE INVENTION

The apparatuses and methods disclosed in this document are described in detail by way of examples and with reference to the figures. Unless otherwise specified, like numbers in the figures indicate references to the same, similar, or corresponding elements throughout the figures. It will be appreciated that modifications to disclosed and described examples, arrangements, configurations, components, elements, apparatuses, methods, materials, etc. can be made and may be desired for a specific application. In this disclosure, any identification of specific shapes, materials, techniques, arrangements, etc. are either related to a specific example presented or are merely a general description of such a shape, material, technique, arrangement, etc. Identifications of specific details or examples are not intended to be, and should not be, construed as mandatory or limiting unless specifically designated as such. Selected examples of apparatuses and methods are hereinafter disclosed and described in detail with reference made to FIGURES.

Figure 1:
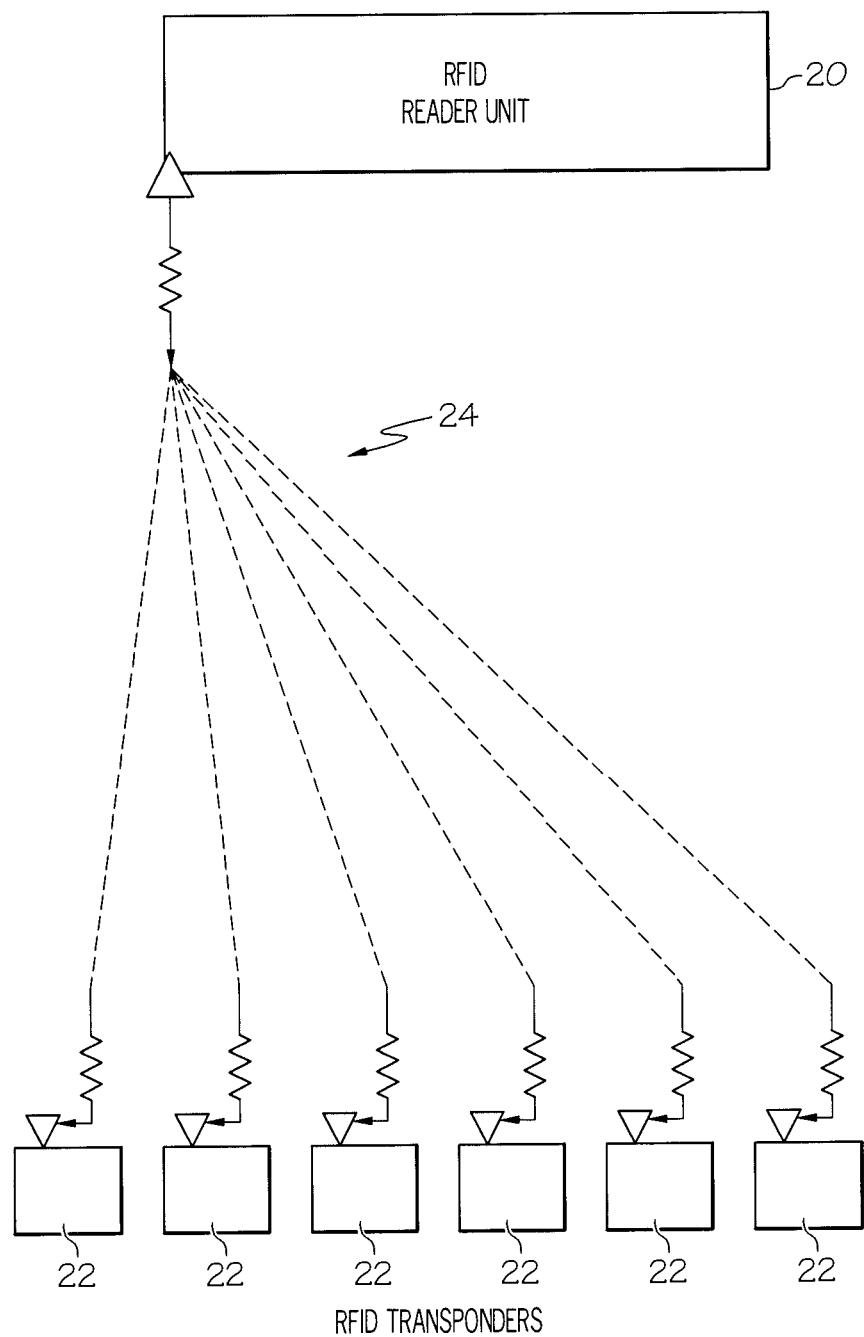
FIG. 1 is a schematic view depicting signal transmission within a conventional RFID system.
Figure 2:
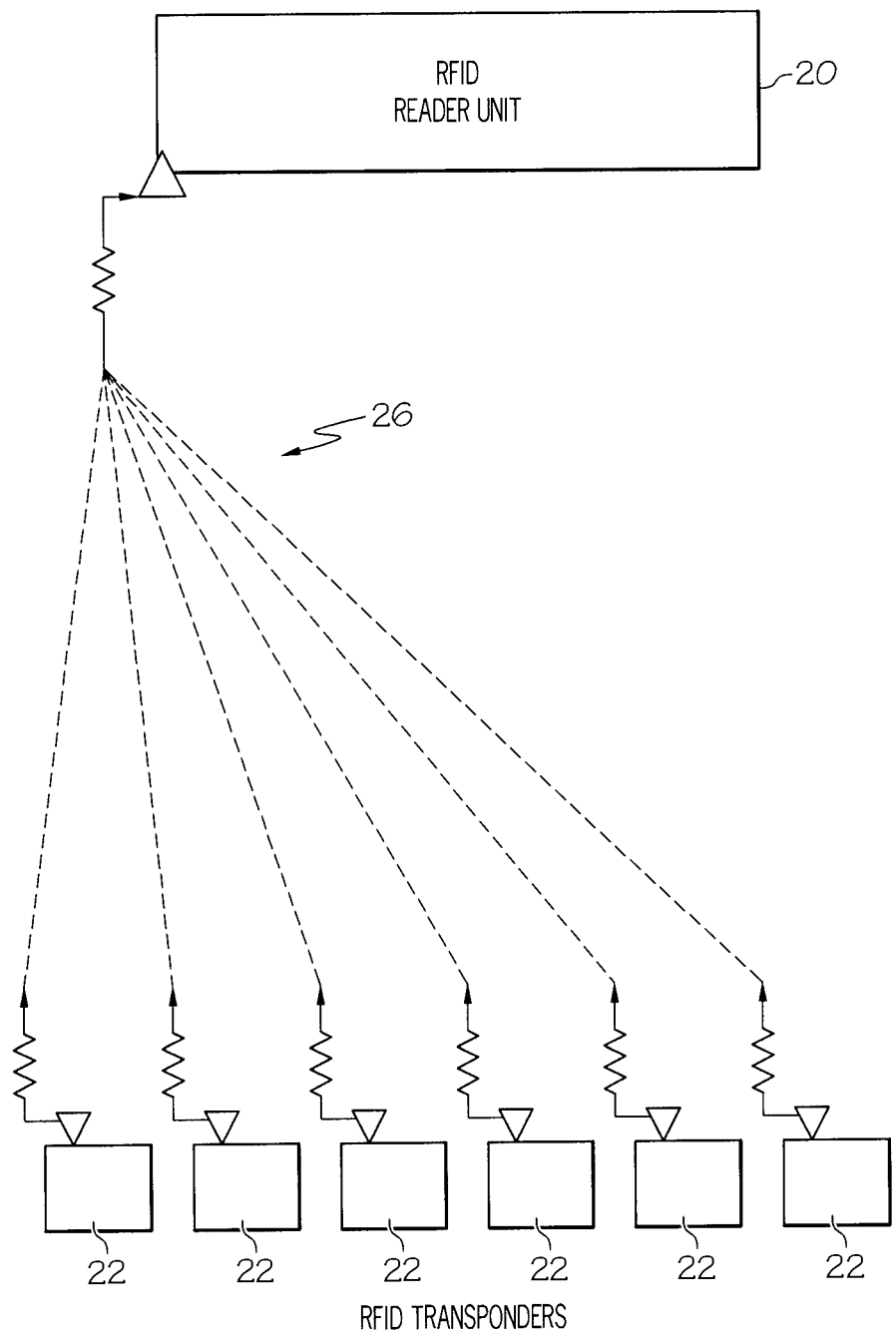
FIG. 2 is another schematic view depicting signal transmission within the conventional RFID system.

FIGS. 1 and 2 illustrate a conventional RFID system that includes an RFID reader 20 configured to communicate with a plurality of RFID transponders 22. As is common, the RFID reader 20 is configured to interrogate the RFID transponders 22. When the RFID reader 20 interrogates the RFID transponders 22, data stored on each RFID transponder 22 (e.g., RFID data) can be transmitted back to the RFID reader 20.

The RFID transponders 22 can be associated with different items (e.g., RFID-enabled items). For example, the RFID transponder 22 can be associated with a package, airline luggage, store inventory, etc. In each case, the RFID transponder 22 carries RFID-data that facilitates identification of the RFID-enabled item associated with the RFID transponder 22. For example, if the RFID transponder 22 is associated with a package, the RFID-data stored on the RFID transponder 22 can include the package's origin address, origination date, destination address, estimated arrival date and the sender's account information. In another example, if the RFID transponder 22 is associated with airline luggage, the RFID-data stored on the RFID transponder 22 can include the flight information, destination information, layover information, and passenger information. The RFID transponders 22 can be associated with any of a variety of items.

In one embodiment, as illustrated in FIG. 1, to gather information from the RFID transponders 22, the RFID reader 20 can transmit an interrogation signal 24 to the plurality of RFID transponders 22. As illustrated in FIG. 2, in response to the interrogation signal 24, each RFID transponder 22 can transmit RFID-data to the RFID reader via an RFID signal 26.

It will be appreciated, however, that a variety of disturbances can affect proper transmission of the interrogation signal 24 and/or the RFID signal 26. For example, the distance between the RFID reader 20 and the plurality of RFID transponders 22 can affect proper transmission of the interrogation signal 24 and/or RFID signal 26. When the RFID reader 20 is immediately adjacent to the plurality of RFID transponders 22, transmission of the interrogation signal 24 and/or RFID signal 26 may not be aversely affected. However, as the distance between the RFID reader 20 and the RFID transponders 22 increases, transmission of the interrogation signal 24 and/or RFID signal 26 may be increasingly affected. In another example, when the RFID transponders 22 are grouped together, some of the RFID transponders 22 may obstruct transmission of the interrogation signal 24 and/or RFID signal 26 corresponding with some other ones of the RFID transponders 22.

Figure 3:
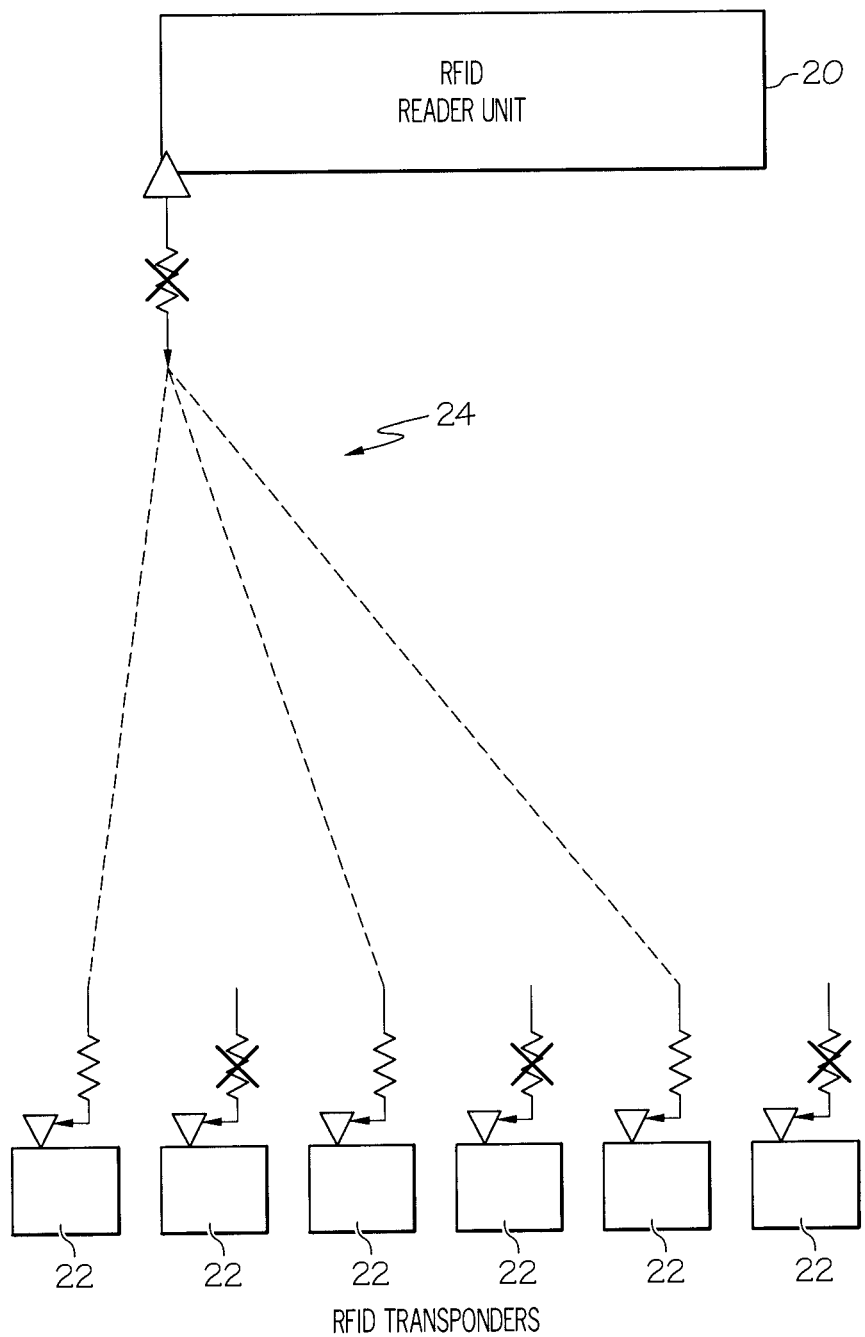
FIG. 3 is yet another schematic view depicting signal transmission within the conventional RFID system.
Figure 4:
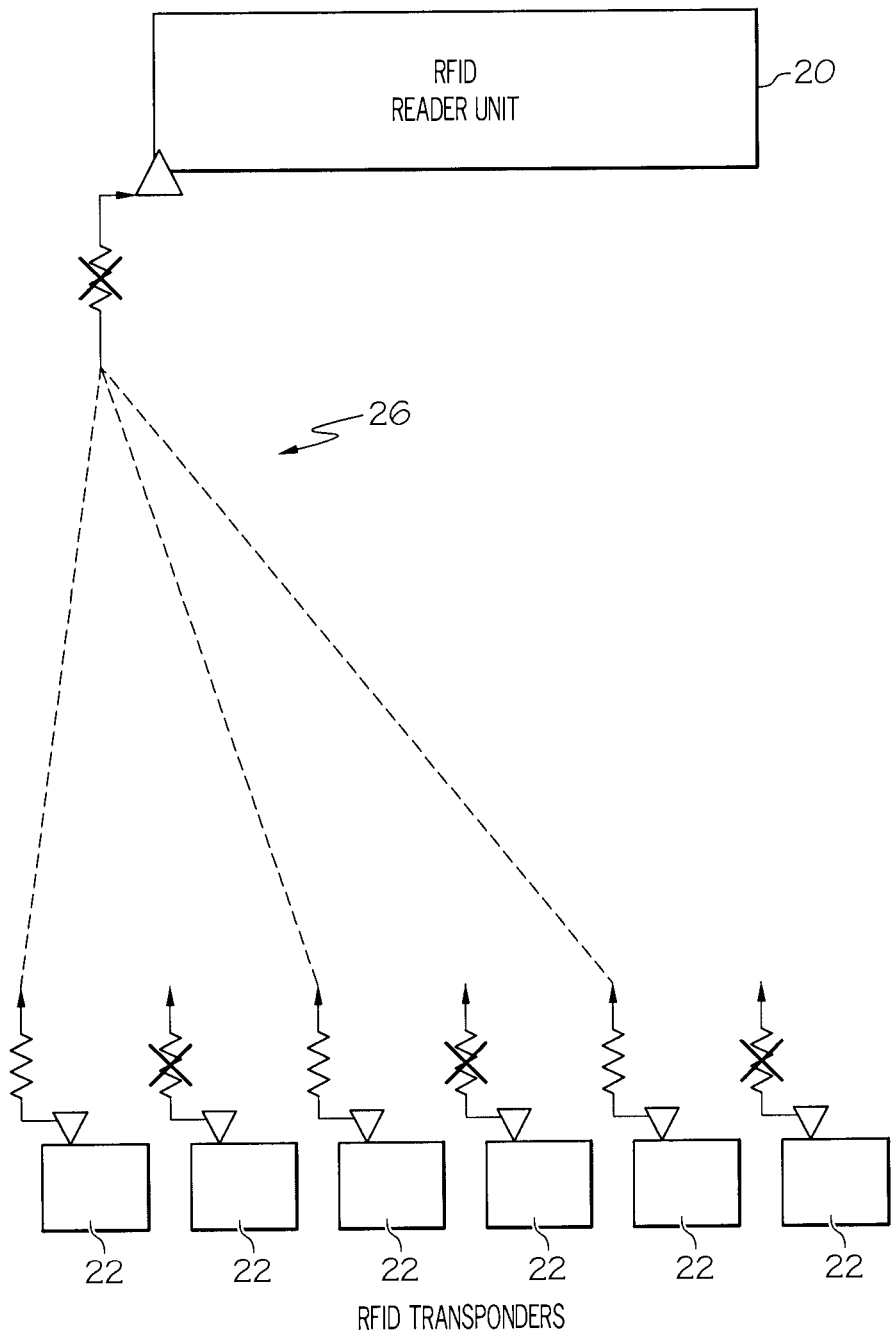
FIG. 4 is yet another schematic view depicting signal transmission within the conventional RFID system.
Figure 5:
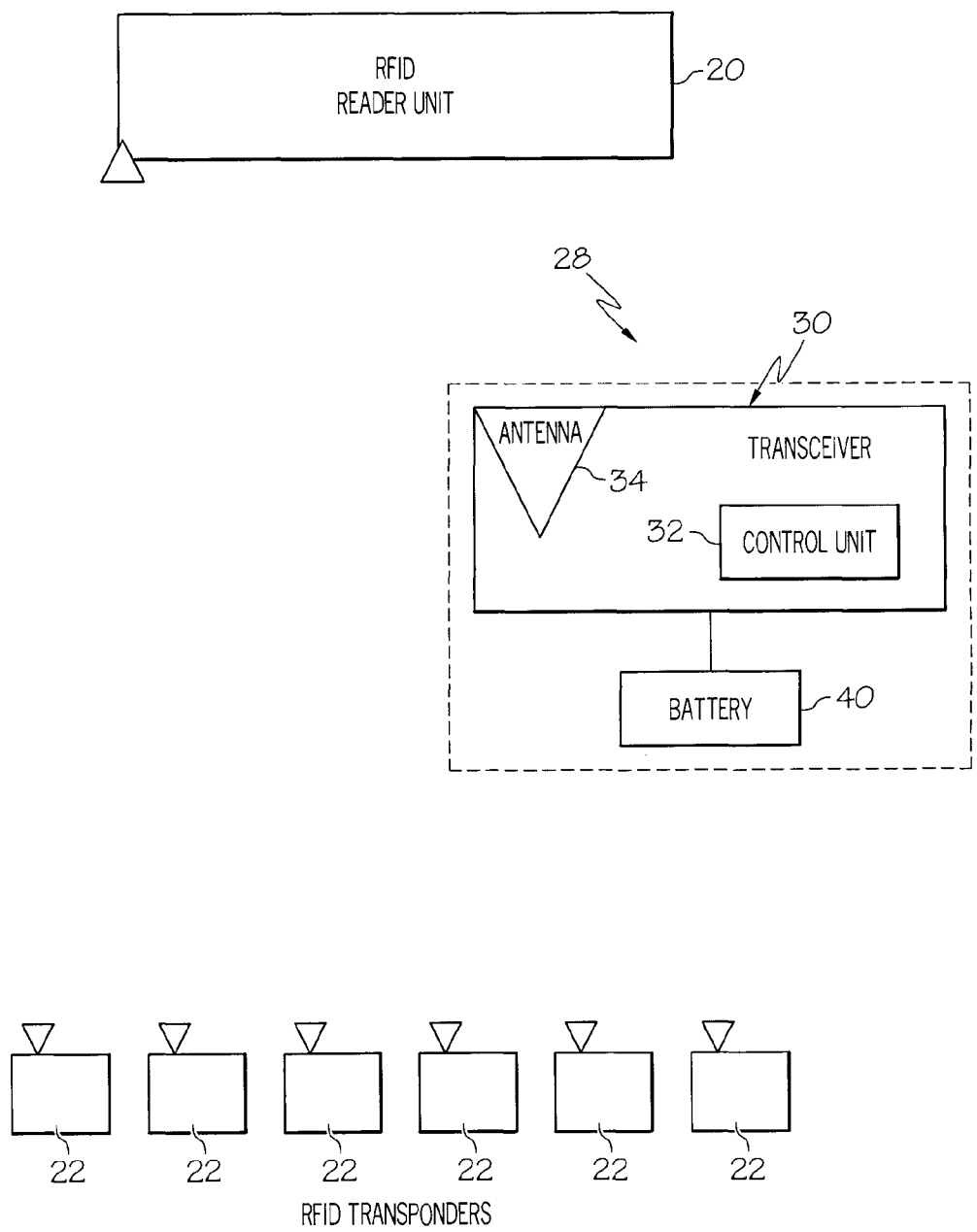
FIG. 5 is a schematic view depicting an RFID system which incorporates an RF repeater according to one embodiment.

Improper transmission of the interrogation signal 24 and/or RFID signal 26 can affect whether RFID-data from the RFID transponders 22 is effectively gathered by the RFID reader 20. In one example, as illustrated in FIG. 3, the interrogation signal 24 sent to the RFID transponders 22 may not reach some of the RFID transponders 22. Accordingly, certain of the RFID transponders 22 will not transmit the RFID signal 26 and the associated RFID-data back to the RFID reader 20. In another example, as illustrated in FIG. 4, RFID signals 26 sent from certain of the RFID transponders 22 may never reach the RFID reader 20. Accordingly, the RFID signal 26 and associated RFID data is never gathered by the RFID reader 20.

In connection with the views and examples of FIGS. 5-17, wherein like numbers indicate the same or corresponding elements throughout the views, an RF repeater 28 can be provided to facilitate effective communication between the RFID reader 20 or external reader system and the RFID transponders 22 associated with various articles. The RF repeater 28 can include a transceiver 30. The transceiver 30 can include a control unit 32 in electrical communication with an antenna 34. The RF repeater can be used to assist or facilitate the reading of the transponders or RFID devices by the reader system 20 so as to obtain the individual ID's or other information from the individual transponders 22.

Figure 6:
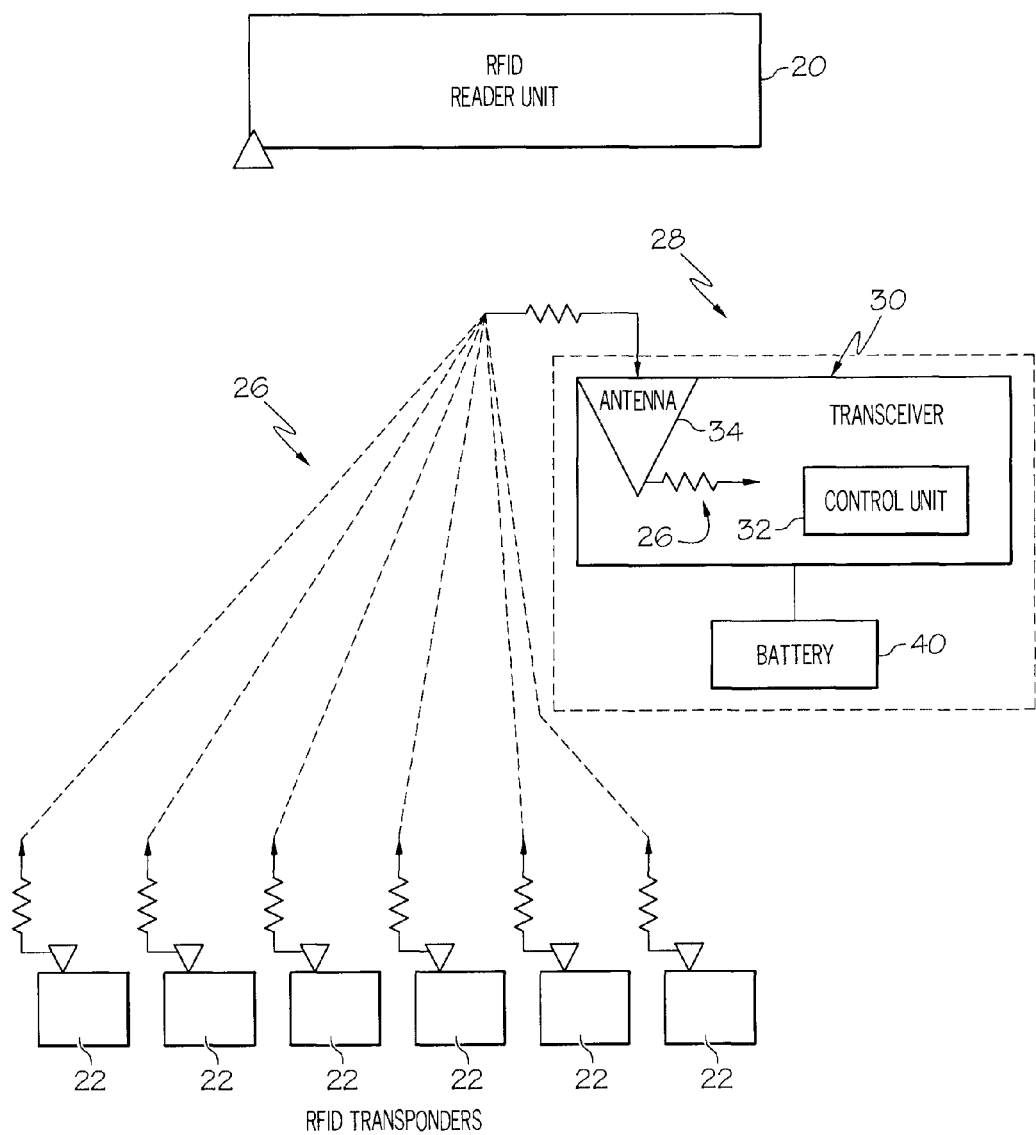
FIG. 6 is a schematic view depicting signal transmission within the RFID system of FIG. 5.
Figure 7:
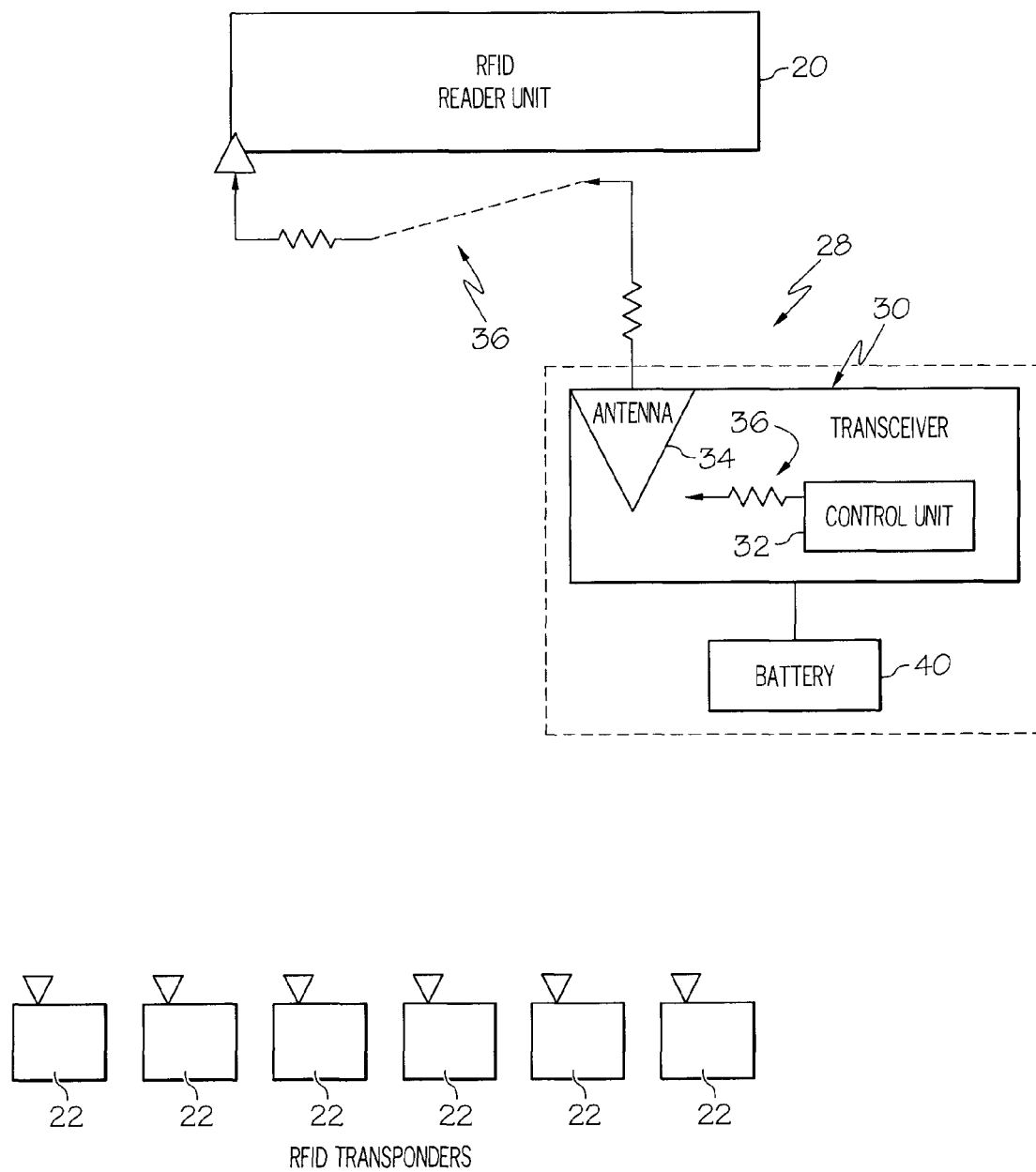
FIG. 7 is another schematic view depicting signal transmission within the RFID system of FIG. 5.

In one embodiment, as illustrated in FIGS. 6 and 7, the RF repeater 28 can be introduced into the RFID system to facilitate transmission of the RFID signals 26 to the RFID reader 20. As illustrated in FIG. 6, the RFID signals 26 from the RFID transponders 22 can be received by the antenna 34. The control unit 32 can then be configured to receive each RFID signal 26 from the antenna 34. The control unit 32 can be configured to convert each of the RFID signals 26 into a converted RFID signal 36 and transmit the converted RFID signal 36 to the antenna 34, as illustrated in FIG. 7. The antenna 34 can then transmit the converted RFID signal 36 to the RFID reader 20. In one embodiment, the control unit 32 can convert the RFID signal 26 into the converted RFID signal 36 by increasing the power of the RFID signal 36. In another embodiment, the control unit 32 can convert the RFID signal 26 into the converted RFID signal 36 by increasing the signal to noise ratio of the RFID signal 26. However, it will be appreciated that the control unit 32 can convert the RFID signal 26 into the converted RFID signal 36 in any of a variety of suitable alternative manners. The reader and/or portable repeater can also be used to cloak a portion of the plurality of signals being generated by the transponders.

Figure 8:
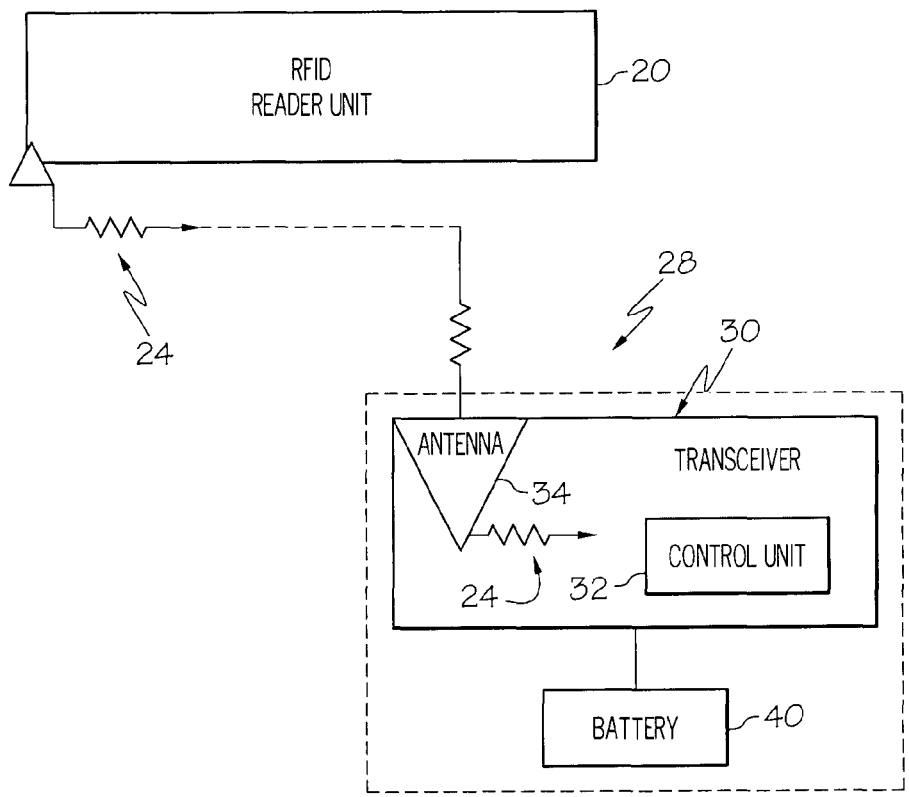
FIG. 8 is yet another schematic view depicting signal transmission within the RFID system of FIG. 5.
Figure 8:
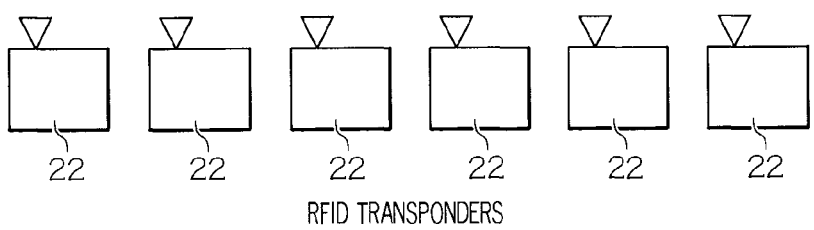
Figure 9:
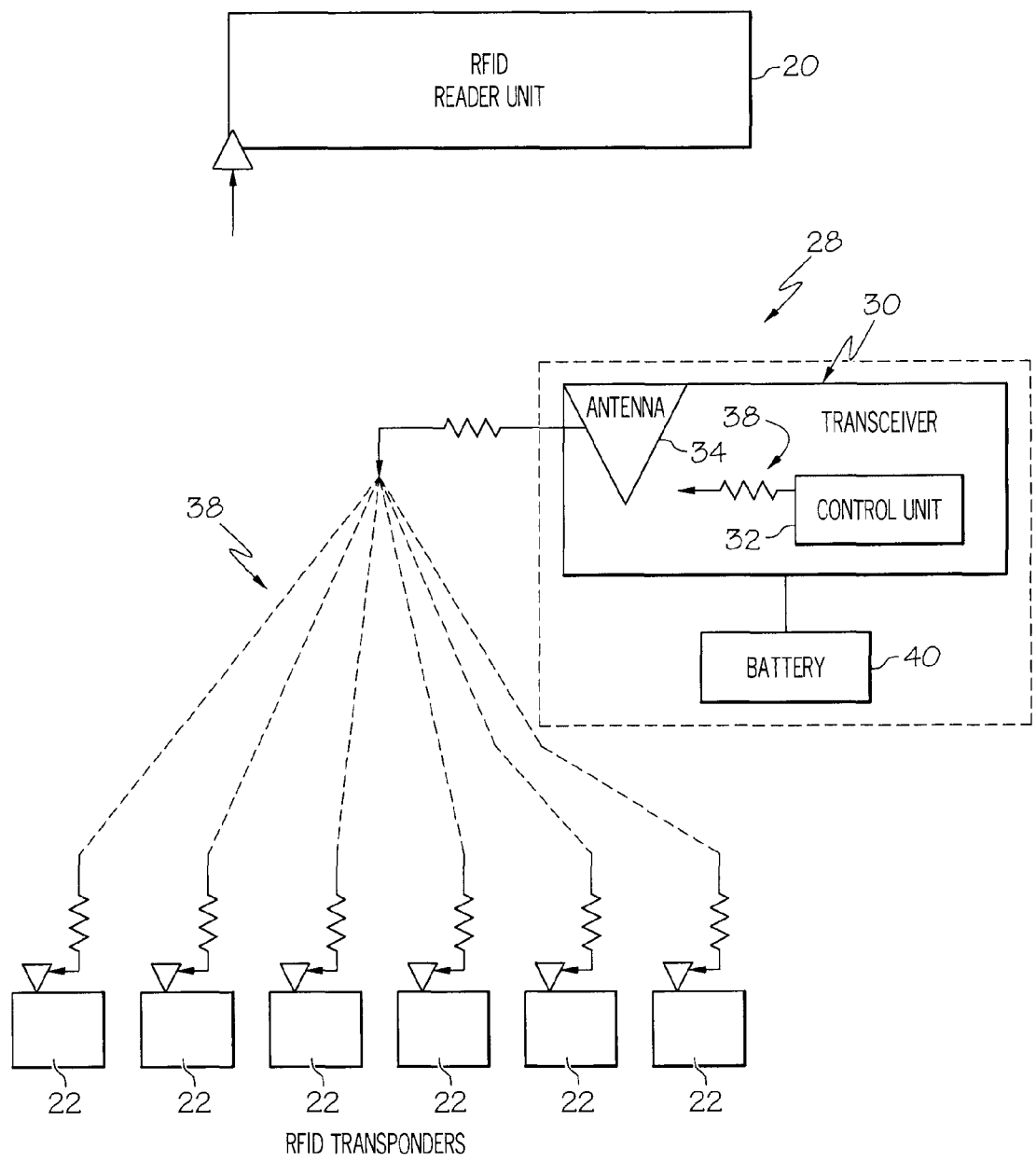
FIG. 9 is still another schematic view depicting signal transmission within the RFID system of FIG. 5.

As illustrated in FIGS. 8 and 9, the RF repeater 28 can additionally or alternatively be configured to facilitate transmission of the interrogation signal 24 from the RF reader 20 to the RFID transponders 22. The RF repeater 28 can be activated based on any one of a number of predetermined stimuli. As illustrated in FIG. 8, the interrogation signal 24 from the RFID reader 20 can be received by the antenna 34. The control unit 32 can be configured to receive the interrogation signal 24 from the antenna 34. The control unit 32 can be configured to then convert the interrogation signal 24 into a converted interrogation signal 38 and transmit the converted interrogation signal 38 to the antenna 34, as illustrated in FIG. 9. The antenna 34 can then transmit the converted interrogation signal 38 to the RFID transponders 22. In one embodiment, the control unit 32 converts the interrogation signal 24 into the converted interrogation signal 38 by increasing the power of the interrogation signal 24. In another embodiment, the control unit 32 converts the interrogation signal 24 into the converted interrogation signal 38 by increasing the signal to noise ratio of the interrogation signal 24. However, it will be appreciated that the control unit 32 can convert the interrogation signal 24 into the converted interrogation signal 38 in any of a variety of suitable alternative manners.

It will be appreciated that the transceiver 30 can be configured to facilitate either unidirectional communication or bidirectional communication. For example, in one embodiment, each of the RFID transponders 22 can be configured to transmit the RFID signal 26 without requiring receipt of the interrogation signal 24. In such an example, the transceiver 30 might not receive the interrogation signal 24 and/or transmit the converted interrogation signal 38. In another embodiment, each of the RFID transponders 22 is configured to transmit the RFID signal 26 only when the RFID transponder 22 is interrogated. In such an example, the transceiver 30 can receive the interrogation signal 24 and transmit the converted interrogation signal 38 to the RFID transponders 22. When each of the RFID transponders 22 responds by transmitting the RFID signal 26, the transceiver 30 can receive the RFID signal 26 and transmit the converted RFID signal 36 to the to the RFID reader 20. It will be appreciated that the control unit 32 can comprise a microprocessor, a digital signal processor, and/or any of a variety of suitable electronic components.

The transceiver 30 can be configured to alternatively operate in a sleep mode and a transmitting mode. When the transceiver 30 operates in the sleep mode, the transceiver 30 can be effectively "turned off". In one embodiment, when the transceiver 30 operates in the sleep mode, the control unit 32 is configured not to transmit converted RFID signals 36 to the antenna 34. In another embodiment, when the transceiver 30 operates in the sleep mode, the control unit 32 is configured to not receive any RFID signals 26 from the antenna 34. In yet another embodiment, when the transceiver 30 operates in the sleep mode, the impedance of the antenna 34 is increased (e.g., tuned or loaded). In such an embodiment, the effective aperture of the antenna 34 can be reduced, thereby minimizing the possibility of coupling with the RFID transponders 22. In yet another embodiment, when the transceiver 30 operates in the sleep mode, the control unit 32 is configured to power down.

When the transceiver 30 operates in the transmitting mode, the transceiver 30 can facilitate communication between the RFID reader 20 and the RFID transponders 22, as described above. For example, when the transceiver 30 operates in the transmitting mode, the RF repeater 28 facilitates transmission of the RFID signals 26 to the RFID reader 20 and/or facilitates transmission of the interrogation signals 24 to the RFID transponders 22.

Typically, the transceiver 30 operates in the sleep mode until an event triggers operation of the transceiver 30 in the transmitting mode. In one embodiment, when the RFID reader 30 sends the interrogation signal 24 to the RFID transponders 22, the transceiver 30 can switch from the sleep mode to the transmitting mode. In such an embodiment, while the transceiver 30 operates in the sleep mode, the control unit 32 can be configured to monitor the antenna 34 to detect for receipt of the interrogation signal 24 by the antenna 34. So long as the transceiver 30 does not receive an interrogation signal 24 (e.g., the RFID reader 20 is not requesting data from the RFID transponders 22), the transceiver 30 can remain in the sleep mode. However, once the control unit 32 detects an interrogation signal 24, the transceiver 30 can switch operation from the sleep mode to the transmitting mode.

In another embodiment, the RFID repeater 28 can detect when the interrogation signal 24 is too weak to reach the RFID transponders 22, and can, upon such detection, switch the transceiver 30 from the sleep mode to the transmitting mode. In such an embodiment, while the transceiver 30 operates in the sleep mode, the control unit 32 can be configured to measure a signal power (e.g., RMS power) of the interrogation signal 24. So long as the signal power is above a particular predetermined threshold power, the transceiver 30 can remain in the sleep mode. However, if the control unit 32 detects that the signal power drops below the threshold power, the transceiver 30 can switch operation from the sleep mode to the transmitting mode.

In yet another embodiment, the RFID repeater 28 can detect when the RFID signal 26 is too weak to reach the RFID reader 20, and can, upon such detection, switch the transceiver 30 from the sleep mode to the transmitting mode. In such an embodiment, while the transceiver 30 operates in the sleep mode, the control unit 32 can measure a signal power (e.g., RMS power) of the RFID signal 26. So long as the signal power is above a particular predetermined threshold power, the transceiver 30 can remain in the sleep mode. However, if the control unit 32 detects that the signal power of the RFID signals 26 drops below the threshold power, the transceiver 30 can switch operation from the sleep mode to the transmitting mode.

In yet another embodiment, the RFID repeater 28 can be configured such that, if the interrogation signal 24 and/or the RFID signals 26 are not reaching the respective RFID transponders 22 and RFID reader 20, the transceiver 30 can switch from the sleep mode to the transmitting mode. In such an embodiment, the RFID reader 20 can be configured to transmit acknowledgement messages to the RFID transponders 22 upon receipt of RFID signals 26 in response to an interrogation signal 24. While the transceiver 30 operates in the sleep mode, the control unit 32 can be configured to detect the acknowledgement messages. So long as the number of RFID transponders is known, the control unit 32 can be configured to determine the ratio of acknowledgement messages detected by the control unit 32 as compared with the total number of RFID transponders 22 in a given group. If this ratio is above a predetermined threshold level, the transceiver 30 can remain in the sleep mode. However, if the control unit 32 detects that this ratio is above the predetermined threshold level, the transceiver 30 can switch operation from the sleep mode to the transmitting mode.

In another embodiment, while the transceiver 30 operates in the sleep mode, the control unit 32 can be configured to examine message traffic between the RFID reader 20 and the RFID transponders 22, such as by monitoring the number of RFID transponders 22 that transmit an RFID signal 26 in response to an interrogation signal 24. So long as the message traffic is above a particular predetermined message traffic threshold, the transceiver 30 can remain in the sleep mode. However, if the control unit 32 detects that the message traffic drops below the message traffic threshold, the transceiver 30 can switch operation from the sleep mode to the transmitting mode. For example, if the number of RFID transponders 22 is known, then the transceiver 30 can switch operation from the sleep mode to the transmitting mode when the number of RFID signals 26 or messages corresponds with less than about 50% of the number of RFID transponders 22. Alternatively, the transponders or a portion thereof can be cloaked to reduce the number of responses.

Figure 10:
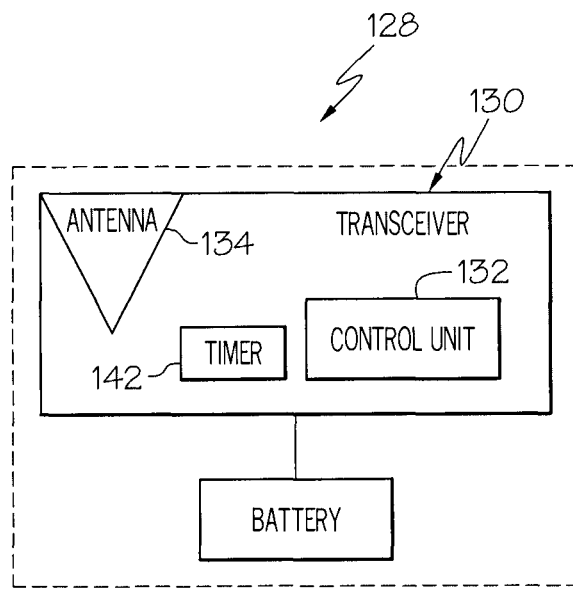
FIG. 10 is a schematic view depicting an RF repeater according to an alternative embodiment.

After the transceiver 30 has operated in the transmitting mode for a predetermined period of time, the transceiver 30 can automatically switch back to the sleep mode (e.g., to conserve energy). For example, as illustrated in FIG. 10, a transceiver 130 in accordance with an alternative embodiment can comprise a timer 142. The timer 142 can be configured to switch operation of the transceiver 130 from a transmitting mode to a sleep mode after a predetermined period of time following receipt by a control unit 132 of an interrogation signal from an associated antenna 134. In one embodiment, the predetermined period of time can be long enough to ensure that the RFID-data from the RFID transponders 22 is properly transmitted to the RFID reader 20.

An RF repeater can further include a power source configured to power its transceiver. In one embodiment, as shown in FIGS. 5-9, the power source can include a battery 40. In another embodiment, the power source can include a capacitor. In addition to or in lieu of a power source, the transceiver 30 can be powered from the interrogation signal 24 or the converted interrogation signal 36 (i.e., passively). In particular, the transceiver 30 can rely upon power provided from the interrogation signal 24 or the converted interrogation signal 36 to power the control unit 32 and/or the antenna 34. It will also be appreciated that the RFID transponders 22 can be active and/or passive. In particular, an active one of the RFID transponders 22 can be powered by a battery, and a passive one of the RFID transponders 22 can be powered by the interrogation signal 24 or the converted interrogation signal 36.

Figure 11:
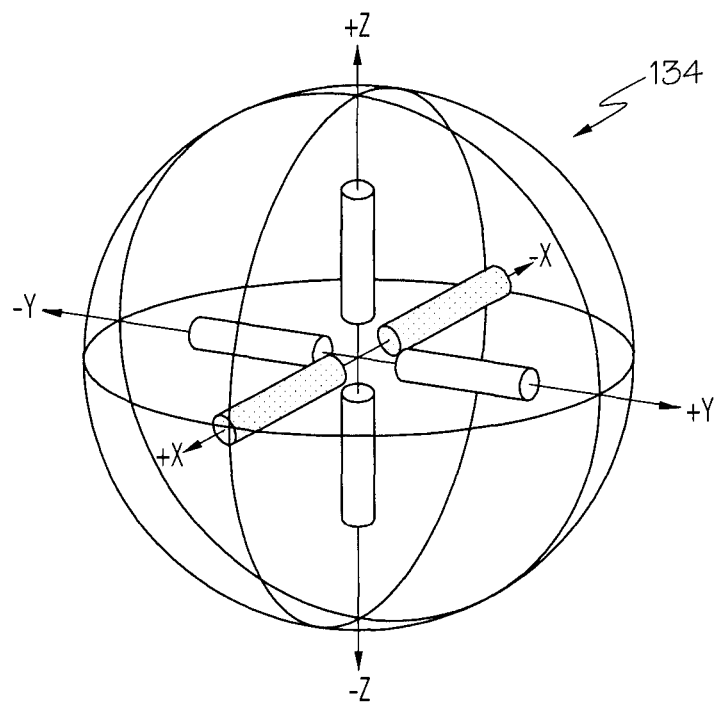
FIG. 11 is a perspective view depicting one embodiment of an antenna that can be associated with the RF repeater depicted in FIG. 5.
Figure 12:
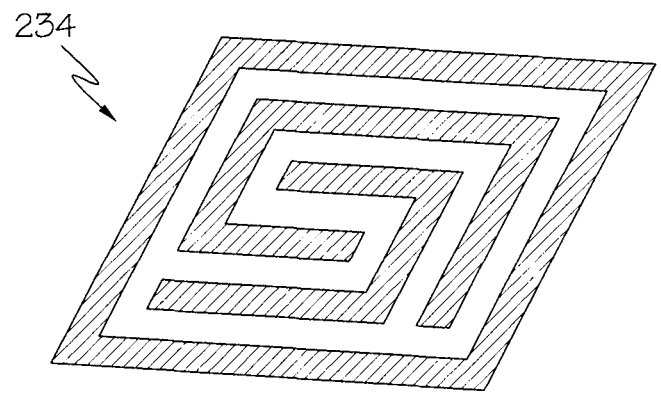
FIG. 12 is a perspective view depicting another embodiment of an antenna that can be associated with the RF repeater depicted in FIG. 5.
Figure 13:
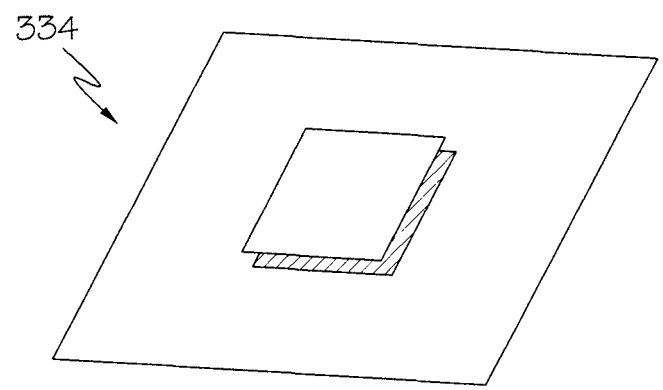
FIG. 13 is a perspective view depicting yet another embodiment of an antenna that can be associated with the RF repeater depicted in FIG. 5.
Figure 14:
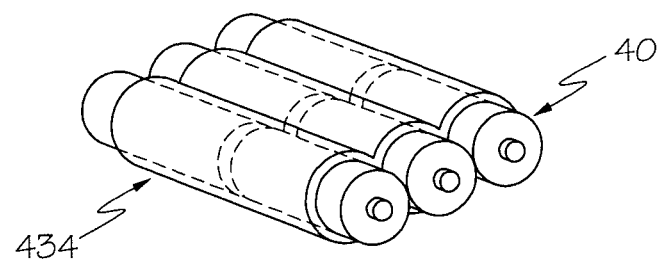
FIG. 14 is a perspective view depicting yet another embodiment of an antenna that can be associated with the RF repeater depicted in FIG. 5.

It will be appreciated that the transceiver 30 can include any of a variety of antenna arrangements that are configured to facilitate reception of the RFID signal 26, reception of the interrogation signal 24, transmission of the converted RFID signal 36, and/or transmission of the converted interrogation signal 38. In one embodiment, the transceiver 30 can include a three-dimensional antenna that can facilitate communication with the RF repeater 28 from any direction. For example, as illustrated in FIG. 11, the transceiver 30 can include a triple-crossed dipole antenna 134. The triple-crossed dipole antenna 134 includes three pairs of dielectric loaded dipoles (e.g., 126, 128, 130) which can intersect each other at degree angles (e.g., to form a three-dimensional arrangement). The interrogation signal 24 from the RFID reader 20 can drive two of the pairs at any given time, thereby allowing the RFID reader 20 to communicate with the RF repeater 28 from any direction as well as transmit a circularly polarized interrogation signal 24. In another example, as illustrated in FIG. 12, the transceiver 30 can include a slot antenna 234. In yet another example, as illustrated in FIG. 13, the transceiver 30 can include a patch antenna 334. In yet another example, as illustrated in FIG. 14, the transceiver 30 can include an antenna 434 that comprises a conductive structure coupled with an exterior surface of the battery 40.

It will be appreciated that the antenna 34 can include any of a variety of suitable materials. In one embodiment, the antenna 34 can be formed from a ceramic material in order to achieve a reduced antenna size. Although the material selected can affect the overall gain of the antenna 34, increased input power to the antenna 34 (e.g., to achieve a desired equivalent isotropically radiated power) can reduce the affect of the material on the overall gain of the antenna 34.

The RF repeater 28 can be configured to be portable so that the RF repeater 28 can be selectively moved between different groups of RFID transponders 22 in order to temporarily facilitate communication between the RFID reader 20 and a certain group of RFID transponders 22. In particular, when the RFID reader 20 and a group of RFID transponders 22 are not communicating directly in an effective manner, the RF repeater 28 can be temporarily placed with the group of RFID transponders 22. Once the RF repeater 28 facilitates effective communication between the RFID reader 20 and the RFID transponders 22, the RF repeater 28 can be removed. Then, if the RFID reader 20 and another group of RFID transponders 22 do not communicate directly in an effective manner, the same RF repeater 28 can be temporarily placed with that group of RFID transponders 22 in order to facilitate effective communication or transmission between the RFID reader 20 and the RFID transponders 22.

Figure 15:
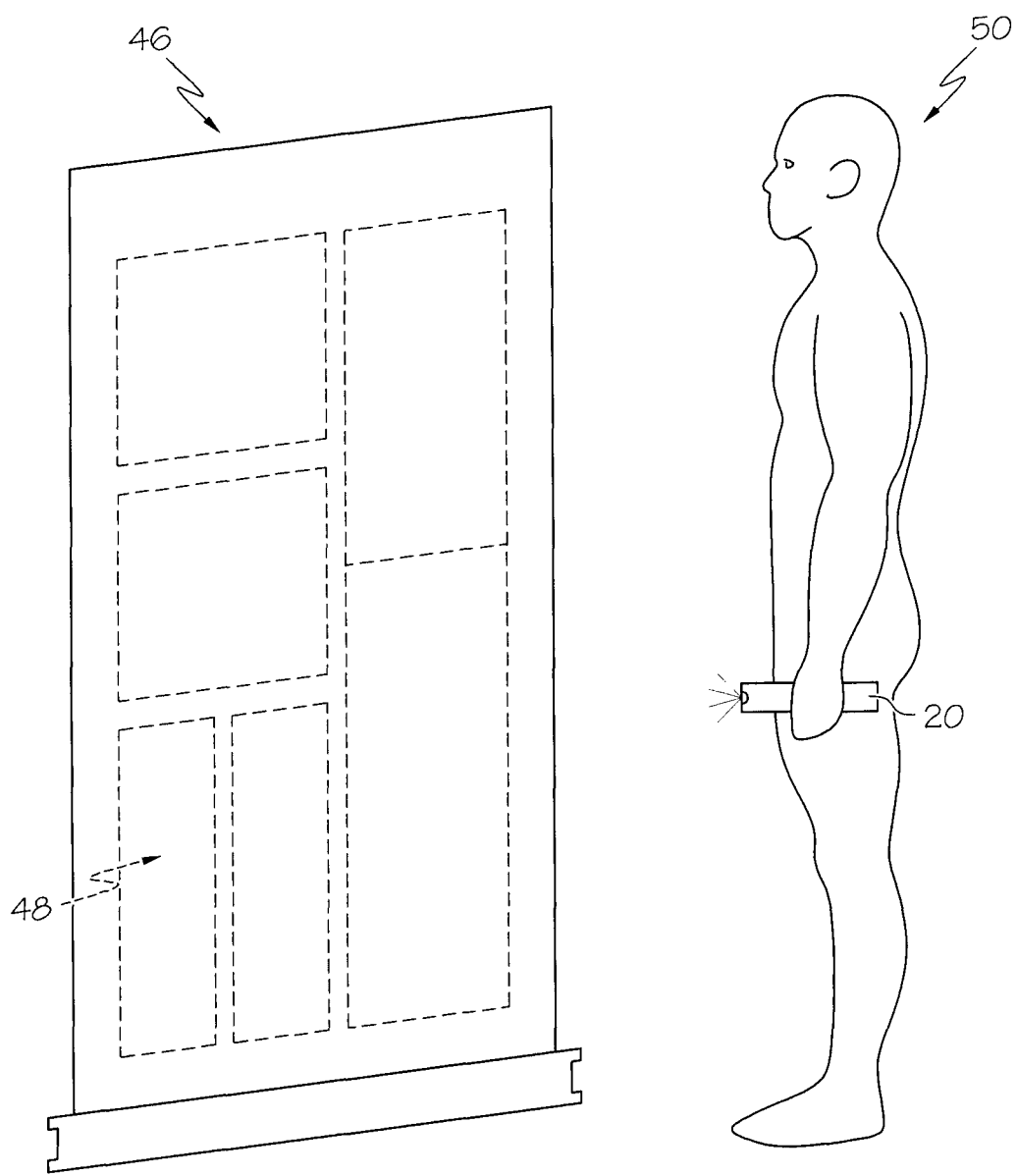
FIG. 15 is an environmental view depicting an RFID reader interrogating RFID-enabled packages disposed within a shipping container.
Figure 16:
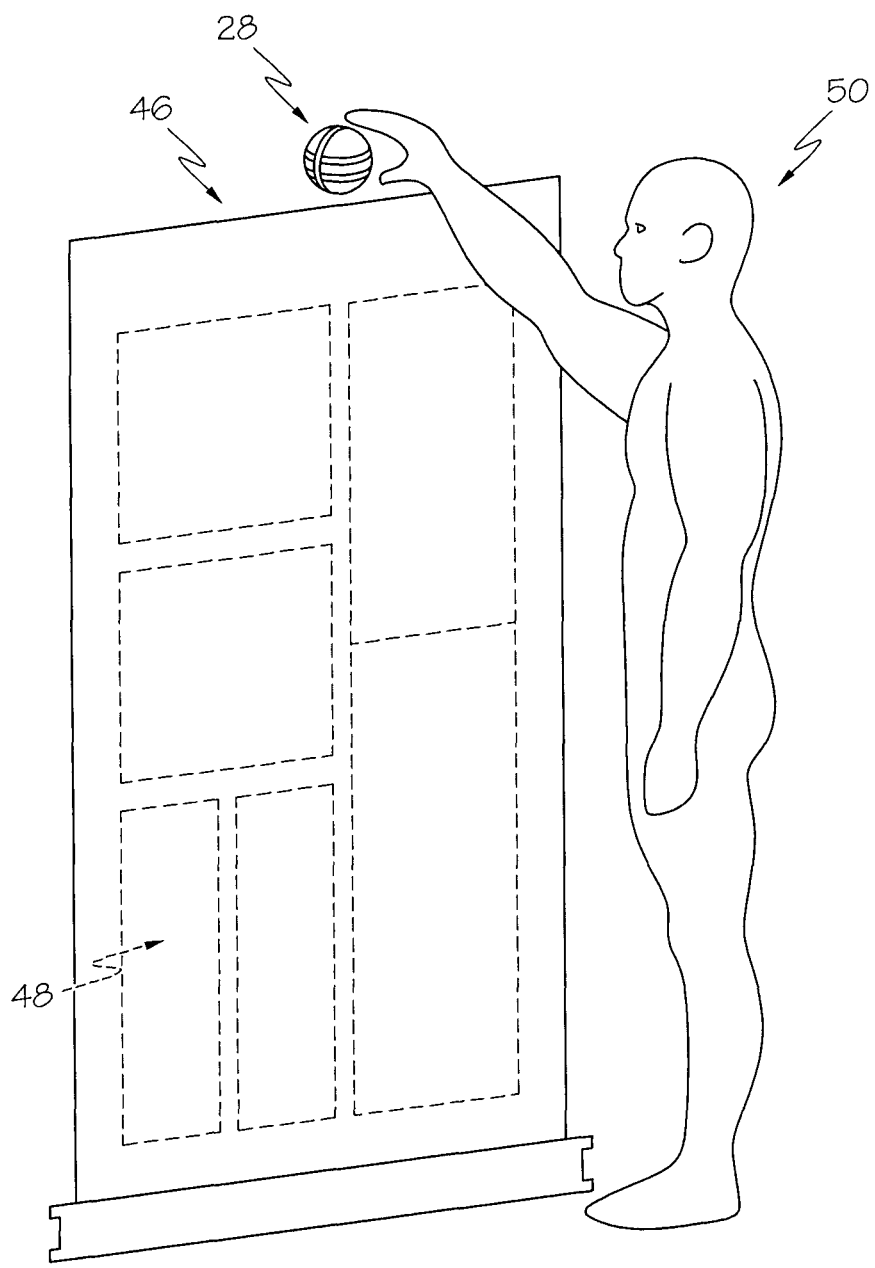
FIG. 16 is an environmental view depicting an RF repeater being provided into the shipping container of FIG. 14.

For example, multiple shipping containers can be maintained at a given facility such as a shipping warehouse. As illustrated in the example of FIG. 15, a shipping container 46 can be loaded with a plurality of RFID-enabled packages 48. Before the shipping container 46 leaves the facility, a user 50 can interrogate the RFID-enabled packages 48 with the RFID reader 20. If any of the RFID-enabled packages 48 does not communicate effectively with the RFID reader 20, the RF repeater 28 can be dropped into the shipping container 46, as illustrated in FIG. 16. Once the RF repeater 28 enables the RFID reader 20 to communicate effectively with the RFID-enabled packages 48, the RF repeater 28 can be removed from the shipping container 46. Subsequently, when other shipping containers are interrogated and the associated RFID-enabled packages do not effectively communicate with the RFID reader 20, the RF repeater 28 can be dropped into or otherwise temporarily associated with those shipping containers. In an alternative embodiment, an RF repeater can be placed in all shipping containers, or all of them known to have experienced problems in the past, before exposure of the shipping container to an RFID reader.

Figure 17:
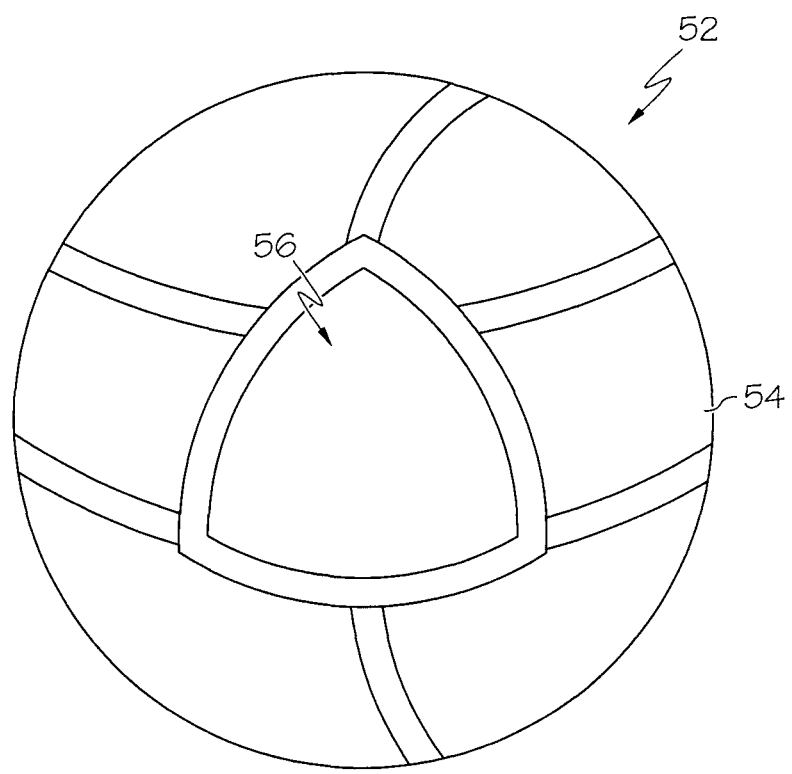
FIG. 17 is a perspective view depicting an RF reader in accordance with one embodiment, wherein a portion of the housing of the RF reader is removed to expose an interior portion.

The transceiver, antenna, battery and/or timer can be disposed within a housing. In one embodiment, and as illustrated in FIG. 17, the RF repeater 28 includes a ball-shaped housing 52. The ball-shaped housing 52 can be formed from a polymeric material and can include reinforcement strips 54. The ball-shaped housing 52 can define a hollow interior 56 that is configured to enclose the transceiver 30, battery 40 and timer 42. It will be appreciated that the housing can be provided in any of a variety of alternative suitable shapes and configurations. In another embodiment, an RF repeater 28 can be removably or permanently integrated into a shipping container (e.g., a pallet, a carton, etc.).

The foregoing description of embodiments and examples has been presented for purposes of illustration and description. It is not intended to be exhaustive or limiting to the forms described. Numerous modifications are possible in light of the above teachings. Some of those modifications have been discussed, and others will be understood by those skilled in the art. The embodiments were chosen and described in order to best illustrate principles of various embodiments as are suited to particular uses contemplated. The scope is, of course, not limited to the examples set forth herein, but can be employed in any number of applications and equivalent devices by those of ordinary skill in the art.

What is claimed is:

1. A portable radio-frequency repeater comprising:
   a housing;
   a transceiver disposed at least partially within the housing and configured to alternatively operate in a transmitting mode and a sleep mode, the transceiver comprising:
      an antenna; and
      a control unit in electrical communication with the antenna; wherein:
         when the transceiver operates in the transmitting mode, the control unit is configured to receive an RFID signal from the antenna, convert the RFID signal into a converted RFID signal, and transmit the converted RFID signal to the antenna;

when the transceiver operates in the sleep mode, the control unit is configured to detect an interrogation signal from the antenna and not to transmit any converted RFID signal to the antenna; and the transceiver is configured to switch operation from the sleep mode to the transmitting mode upon detection by the control unit of the interrogation signal.

2. The portable radio-frequency repeater of claim 1 wherein the interrogation signal powers the transceiver.

3. The portable radio-frequency repeater of claim 1 wherein the transceiver further comprises a timer that is configured to switch operation of the transceiver from the transmitting mode to the sleep mode after a predetermined period of time following detection by the control unit of the interrogation signal.

4. The portable radio-frequency repeater of claim 1 further comprising a power source configured to power the transceiver, the power source being at least partially disposed within the housing.

5. The portable radio-frequency repeater of claim 4 wherein the power source comprises at least one of a capacitor and a battery.

6. The portable radio-frequency repeater of claim 5 wherein the power source comprises a battery and the antenna comprises a conductive structure coupled with an exterior surface of the battery.

7. The portable radio-frequency repeater of claim 1 wherein the antenna comprises a three-dimensional antenna.

8. The portable radio-frequency repeater of claim 1 wherein the antenna comprises one of a slot antenna, a patch antenna, and a dipole antenna.

9. The portable radio-frequency repeater of claim 8 wherein the antenna comprises a dipole antenna and the dipole antenna comprises a triple-crossed dipole antenna.

10. The portable radio-frequency repeater of claim 1 wherein the antenna is formed from a ceramic material.

11. The portable radio-frequency repeater of claim 1 wherein the antenna has an antenna impedance and when the transceiver is in the sleep mode, the antenna impedance is increased as compared to when the transceiver is in the transmitting mode.

12. The portable radio-frequency repeater of claim 1 wherein the control unit is configured to measure a signal power of the interrogation signal and switch operation from the sleep mode to the transmitting mode when the signal power is below a threshold power.

13. The portable radio-frequency repeater of claim 1 wherein the antenna is configured to receive the RFID signal from a plurality of RFID transponders.

14. The portable radio-frequency repeater of claim 13 wherein the antenna is configured to receive the interrogation signal from an RFID reader.

15. The portable radio-frequency repeater of claim 1 wherein the control unit is configured to detect acknowledge messages transmitted from an RFID reader to RFID transponders and switch operation from the sleep mode to the transmitting mode when the ratio of acknowledge message quantity to RFID transponders is below a threshold level.

16. A portable radio-frequency repeater comprising:
a housing;
a transceiver disposed at least partially within the housing and configured to alternatively operate in a transmitting mode and a sleep mode, the transceiver comprising:
a triple-crossed dipole antenna configured to receive an RFID signal from a plurality of RFID transponders and to receive an interrogation signal from an RFID reader; and
a control unit in electrical communication with the triple-crossed dipole antenna; and
a battery disposed at least partially within the housing and configured to power the transceiver, wherein:
when the transceiver operates in the transmitting mode, the control unit is configured to receive the RFID signal from the triple-crossed dipole antenna, convert the RFID signal into a converted RFID signal, and transmit the converted RFID signal to the triple-crossed dipole antenna; and
when the transceiver operates in the sleep mode, the control unit is configured to detect the interrogation signal from the triple-crossed dipole antenna and not to transmit any converted RFID signal to the triple-crossed dipole antenna.

17. The portable radio-frequency repeater of claim 14 wherein the control unit is configured to detect acknowledge messages transmitted from an RFID reader to RFID transponders and switch operation from the sleep mode to the transmitting mode when the ratio of acknowledge message quantity to RFID transponders is below a threshold level.

18. The portable radio-frequency repeater of claim 16 wherein the triple-crossed dipole antenna comprises a conductive structure coupled with an exterior surface of the battery.

19. A portable radio-frequency repeater comprising:
a housing;
a transceiver disposed at least partially within the housing and configured to alternately operate in a transmitting mode and a sleep mode, the transceiver comprising:
an antenna having an antenna impedance and configured to receive an RFID signal from a plurality of RFID transponders and receive an interrogation signal from an RFID reader; and
a control unit in electrical communication with the antenna; wherein:
when the transceiver operates in the transmitting mode, the control unit is configured to receive the RFID signal from the antenna, convert the RFID signal into a converted RFID signal, and transmit the converted RFID signal to the antenna;
when the transceiver operates in the sleep mode, the antenna impedance is increased as compared to when the transceiver is in the transmitting mode and the control unit is configured to detect the interrogation signal from the antenna and not to transmit any converted RFID signal to the antenna; and
the transceiver is configured to switch operation from the sleep mode to the transmitting mode upon detection by the control unit of the interrogation signal.

20. A method of using a portable RFID repeater, comprising the steps of;
providing a RFID repeater having a transceiver disposed within a housing and having a sleep mode and an activated mode;
supplying a plurality of articles with at least some of the articles having RFID transponders disposed thereon;
generating a plurality of signals from the transponders;
receiving the plurality of signals at a RFID reader;
determining if the RFID reader receives and reads the plurality of signals;

activating the RFID repeater to change from the sleep mode to the activated mode;

reading the plurality of signals to determine ID's for each of the plurality of articles;

relaying the IDs from the RFID repeater to the reader system; and deactivating the RFID repeater to change from an activated mode to a sleep mode.

21. The method as recited in claim 20, including a further step of cloaking at least a portion of the plurality of signals after the step of determining.

22. The method as recited in claim 20 including a further step of analyzing strength of the plurality of signals after the step of reading.

23. The method as recited in claim 20, including a further step of synchronizing the plurality of signals after the step of reading.

24. A method for reading a plurality of RFID transponders, comprising the steps of;

providing a plurality of RFID transponders;

generating a signal to read the RFID transponders;

receiving a response from each of the RFID transponders;

activating a portable RFID repeater based on the response received from the RFID transponders;

reading the response from each of the RFID transponders to determine an ID;

relaying the response from the RFID repeater to the RFID reader; and deactivating the RFID repeater.

\* \* \* \* \*